United States Patent [19]

Gruber

[11] Patent Number: 4,572,232
[45] Date of Patent: Feb. 25, 1986

[54] CONCEALED SANITARY VALVE UNIT

[76] Inventor: Walter F. Gruber, Widmaierstr. 165 B, D-7000 Stuttgart 80, Fed. Rep. of Germany

[21] Appl. No.: 636,311

[22] Filed: Jul. 31, 1984

[30] Foreign Application Priority Data

Aug. 2, 1984 [DE] Fed. Rep. of Germany ....... 3327829

[51] Int. Cl.⁴ .......................... F16L 5/00; E03C 1/00
[52] U.S. Cl. .................................. 137/360; 137/359; 4/191; 4/192
[58] Field of Search ............... 137/359, 360, 315, 316; 4/191, 192; 251/367

[56] References Cited

U.S. PATENT DOCUMENTS

| 1,693,758 | 12/1928 | Hennessey | 137/360 |
| 2,747,604 | 5/1956 | Fraser | 137/360 |
| 3,034,138 | 5/1962 | Filliung | 4/192 |
| 3,117,588 | 1/1964 | Billeter | 137/359 |
| 3,563,267 | 2/1971 | Thompson | 137/360 |
| 4,103,865 | 8/1978 | Nonba et al. | 251/148 |
| 4,161,958 | 7/1979 | Behle | 137/316 |
| 4,356,574 | 11/1982 | Johnson | 4/191 |

FOREIGN PATENT DOCUMENTS 2452659 11/1980 France ................................ 137/360

Primary Examiner—A. Michael Chambers
Attorney, Agent, or Firm—Fred Philpitt

[57] ABSTRACT

In a concealed sanitary valve unit the valve body received in a concealed outer housing is made from plastic material. In order not to exert excessive mechanical loads, particularly torsional and tensional loads onto the valve body improved clamping means are provided which will exert onto the valve body only small compressive loads. Connection of the valve body to the feed and work lines extending through the wall is achieved without making use of threadings, since connecting nuts are fixed to the feed viz. work lines having plane end faces adapted to sealingly engage plane connecting faces of the valve body.

14 Claims, 4 Drawing Figures

CONCEALED SANITARY VALVE UNIT

DESCRIPTION

The present invention relates to a concealed sanitary valve unit comprising a housing adapted to be inserted into a wall opening for flush mounting therein, said housing having openings adapted to accomodate at least one water supply line extending through said wall, comprising at least one valve body arranged within said housing and including control elements and passageways adapted to control at least one water flow path, operating members associated thereto extending through a mounting window of said housing.

Such prior art sanitary valve units for flush mounting in the wall of a building the valve body is made from metal. Connection of the valve body to the supply lines is achieved by means of threadings formed in the material of the valve body. Thus the valve body is essentially contained within the buried case. This way of connecting and mounting the valve body necessarily implies noticeable tensional and torsional stresses which exclude forming of the valve body from plastic material. However, the use of plastic material is highly desirable for economic reasons, and particularly in connection with such concealed valve units the outer appearance of the valve body would not present an obstacle to the use of plastic material.

Thus it is an object of the present invention to provide a concealed sanitary unit of the type referred to above, wherein the connection means provided to connect the valve body to the supply lines of the building and the valve body mounting means of the buried case are formed such that only small mechanical stress is experienced by the valve body and particularly torsional and tensional loads onto the valve body are kept small.

It is a further object of the present invention to provide a valve unit, the valve body of which need not be formed with threadings.

To this end the invention proposes a valve unit of the type referred to above, wherein:

(a) the valve body is formed with at least one plane outer connecting face, a feed passage or a work passage of the valve body merging into said connecting face;

(b) a connecting nut adapted to be screwed onto the end portion of a supply line is provided for each of such supply lines, said connecting nuts having a plane end face adapted to sealingly engage an opposing one of the connecting faces of the valve body;

(c) valve body clamping means are provided engaging two plane faces thereof and positively positioning said valve body by clamping action; and (d) mounting means are provided to connect said clamping means to said case.

The clamping means used to fix the valve body in the buried case will exert only very small compressive forces onto the valve body. Tensional or torsional loads are essentially eliminated, this feature being of considerable importance in view of the fact that plastic materials show only comparatively small resistance with respect to such loads. Since in accordance with the present invention the connecting nuts have plane contact faces engaging corresponding plane connecting faces of the valve body, no threadings are required, such threadings being difficult to be formed in parts made from plastic materials.

According to a further aspect of the present invention, the clamping means include two metallic plates and two threaded clamping spindles interconnecting said metallic plates for relative mutual movement.

Actuation of the clamping means is particularly easy if in accordance with a further development of the present application each of the clamping spindles includes opposing end portions having threads of opposite sense formed thereon and running in corresponding threadings formed in said metallic plates such that rotation of the clamping spindle in one sense will result in a decrease of the distance defined between said metallic plates, while rotation of said clamping spindle in the opposite sense will result in an increase of said distance.

In such case rotation of the clamping spindles in one sense will diminish the distance defined between the metallic plates, while rotation of the clamping spindles in the opposite sense will result in an increase of the distance.

Each of the clamping spindles may have a central portion being formed with drive faces adapted to cooperate with a spanner. Thus a simple spanner will be sufficient for mounting the valve body in the buried case or for removal of the valve body therefrom.

In accordance wtih a further aspect of the invention, the clamping means may comprise flat parallel mounting tabs arranged in a rectangular pattern, said mounting tabs being supported from a wall of said case and each including a cutout, each of said clamping spindles extending through aligned cut-outs of two opposing mounting tabs. Thus, the two clamping spindles and the two metallic plates define a rectangular surrounding the valve body.

Preferably the mounting tabs are formed integral with the buried case. If the cut-outs of the mounting tabs are U-shaped, insertion of the clamping spindles is particularly easy.

If a split-valve body including a plurality of valve body segments is provided, each of the valve body segments may comprise a plane connecting face, the valve body segments being positively clamped together by the clamping means, said plane connecting faces of the valve body segments interengaging, seal means being interposed therebetween.

Preferably the metallic flanges may comprise thru-openings adapted to receive a connecting nut, respectively, and in the end portions of the connecting nuts include flange portions, the diameter of which exceeds the diameter of said thru-openings of said metallic plates such that the flange portions of the connecting nuts are forcefully urged against the corresponding connecting face of the valve body, when the distance defined between said metallic plates is diminished.

In such a valve unit the clamping direction of the clamping means coincides with the direction of the connecting nuts being urged towards the connecting faces of the valve body. Thus, mounting of the valve body in the buried case will simultaneously result in reliable sealing engagement of the connecting nuts and the connecting faces of the valve body.

Preferably O-ring seal means are carried by the end face of the flange portion of the connecting nuts. Thus, these seal means each surround a port defined by a feed passage or a work passage of the valve body in the assembled state of the valve unit.

A metallic support plate may overlie the one surface of the valve body being accessible through the mounting window of the case thus closing one or a plurality of valve bores adapted to receive an associated valve control assembly, respectively, the support plate being connected to the valve body by means of screws fed through the valve body. Thus, the support plate will form a reaction member taking up the pressure due to the pressurized water confined within the valve bores while simultaneously positioning the various valve control assemblies.

In addition to the above mounting tabs or mounting brackets serving to fix the clamping means to the buried case, additional support tabs may be provided being removably connected to the buried case and serving to position at least one bridging tube member adapted to interconnect two of the connecting nuts in an initial installation phase. Thus, no special molded parts are required, when the supply lines of the building are checked in pressurized state after an initial installation phase wherein only the primary connections have been installed, such test being effected without a valve body being inserted into the concealed housing.

For sake of convenience, these additional support tabs are formed integral with the concealed case adapted to be broken away therefrom. When the initial phase of installation has been terminated and the valve body is to be inserted into the concealed case, the bridging tube members are simply removed from the housing and the associated support tabs are torn off.

The invention will now be explained in more detail describing a preferred embodiment thereof referring to the enclosed drawings. Therein:

Figure 3:
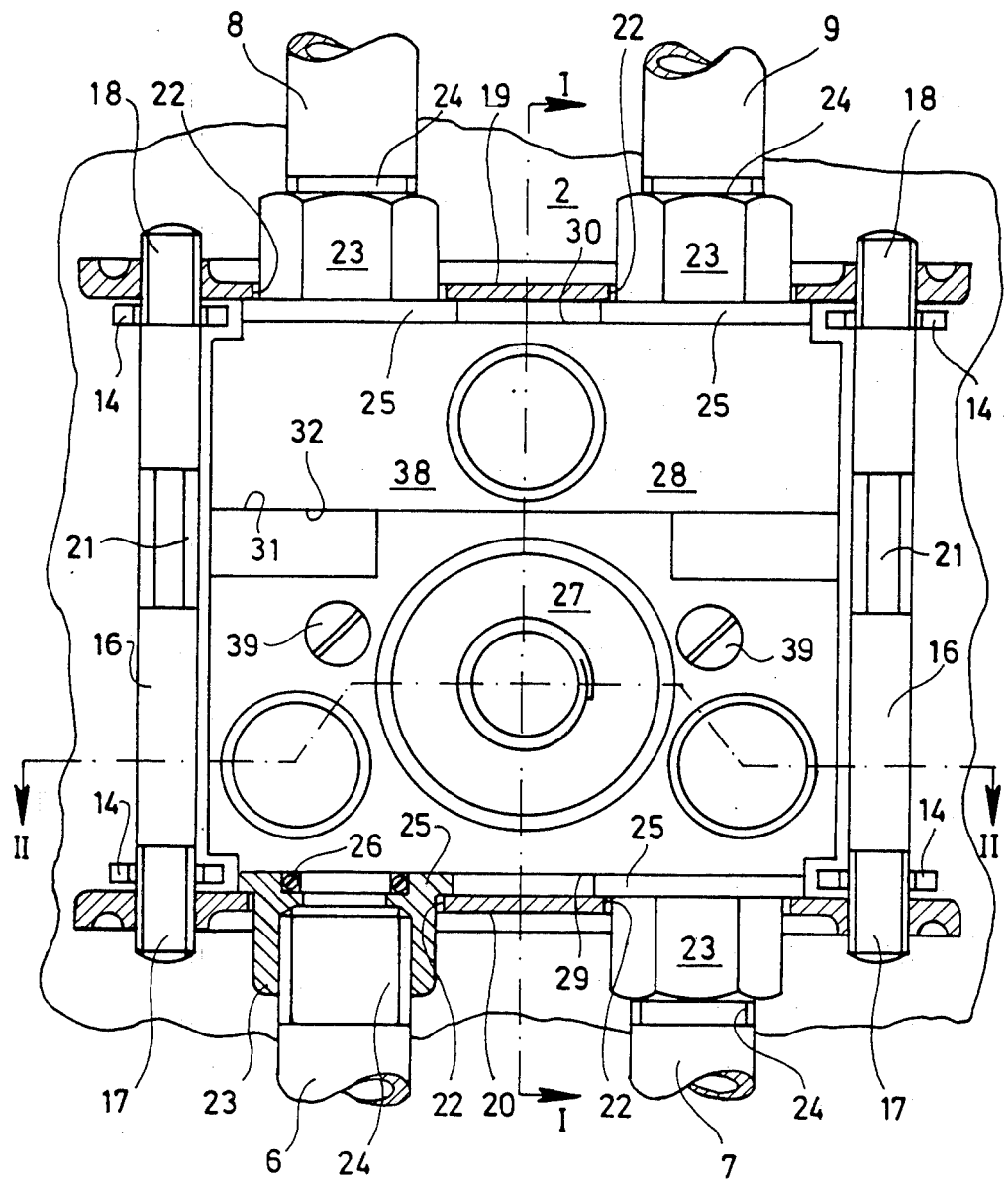
Figure 4:
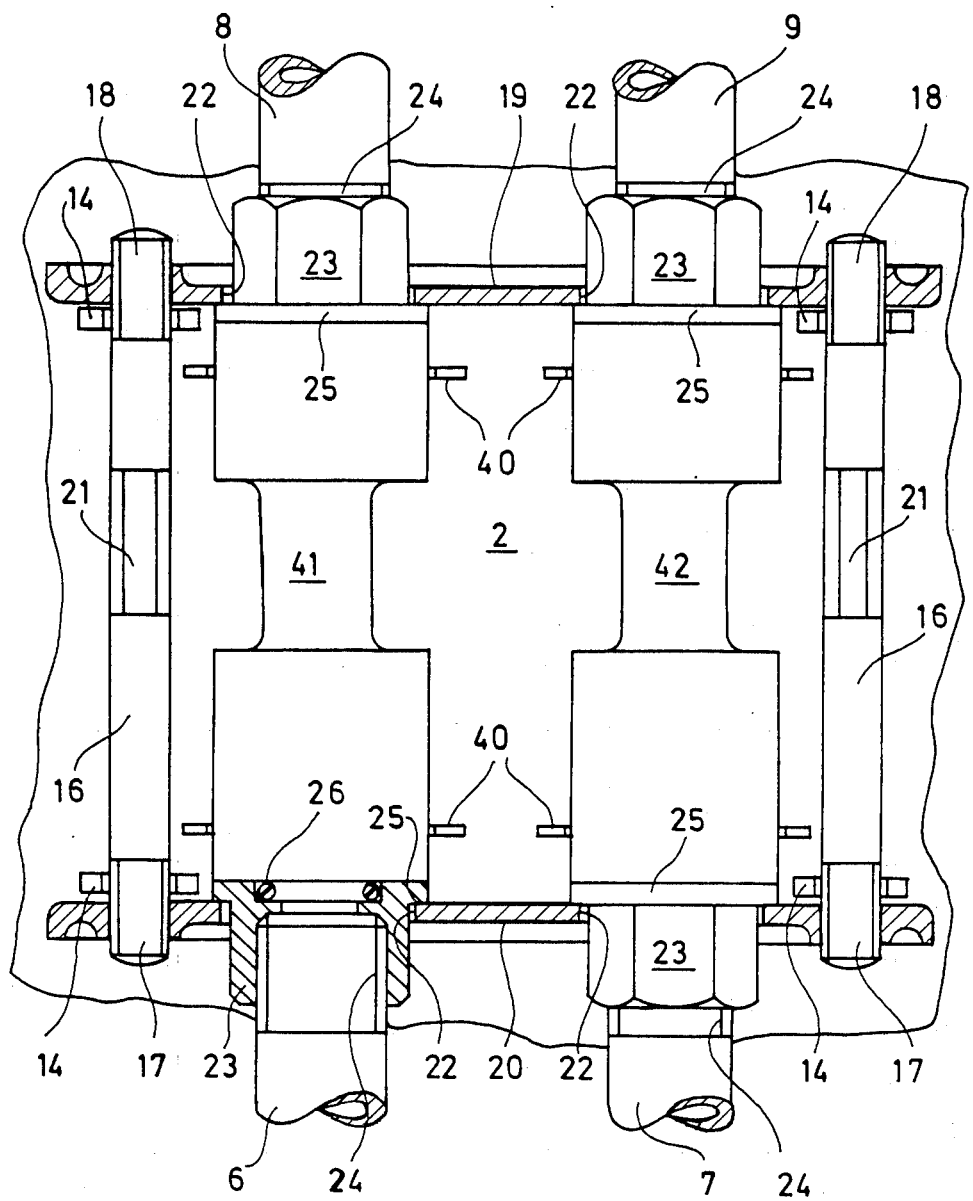

FIG. 3 shows a top view of valve body mounting and clamping means of the concealed valve unit, the valve body being formed by a valve body segment associated to the thermostatic valve and a further valve body segment associated to the switching valve; and FIG. 4 shows a top view corresponding to FIG. 3, wherein two bridging tube members have been installed in the mounting means instead of the valve body.

In the drawings 1 is a case flush mounted in the wall of a building. Housing 1 has a bottom wall 2 and lateral walls 3 as well as an end face including a neck portion 4 extending through a window formed in a tile wall panelling 5. Water feed lines 6, 7 supplying hot and cold water, respectively, as well as work lines 8, 9 (see FIG. 3) extend through respective openings in the side walls 3 of case 1, work line 8 being e.g. connected to a bath tub spout, while work line 9 will supply water to a shower.

The concealed valve unit includes a thermostatic valve 10 as well as a tub/shower switching valve 11 mounted in a way described in more detail below. The kind of sanitary valve contained in the concealed valve unit is of secondary importance in view of the present invention. Thus, the thermostatic valve 10 could be replaced by a one-lever mixing faucet or a two-lever mixing battery.

The window formed in the tile panelling 5 is closed by a rose or cover 44 having openings receiving operating members 12, 13 of the thermostatic valve 10 viz. the switching valve 11.

Four flat parallel mounting brackets 14 are formed integral with the bottom wall 2 of housing 1 being arranged at the sides of an imaginary rectangle. Each of the support brackets 14 has a U-shaped cut-out 15 formed at the free end thereof as may be seen from FIG. 2. Two clamping spindles 16 extend through the U-shaped cut-outs 15 of two opposing mounting brackets 14, respectively. The clamping spindles 16 each have oppositely directed threadings 17, 18 formed on opposing end portions thereof.

Adjacent end portions of the two clamping spindles 16 carrying threadings 17 or 18 in the the same direction run in threaded bores formed in two metallic clamping plates 19, 20 arranged in spaced opposing relationship. A central portion 21 of the clamping spindles 16 is formed as a drive portion having torque transmitting drive faces so as to cooperate with a spanner. It will be understood that rotation of the clamping spindles 16 in one direction will result in a decrease of the distance defined between the clamping plate 19,20 while rotation of the clamping spindles 16 in the opposite direction will increase the distance between the clamping plates.

The clamping plates 19, 20 have openings 22 receiving connecting nuts 23 running on threadings 24 formed on end portions of the feed lines 6, 7 viz. the work lines 8, 9. The connecting nuts 23 are formed with an integral flange portion 25, the diameter of which exceeds the diameter of the openings 22 provided in the clamping plates 19,20. The plane end face of the flange portions 25 receives an O-ring seal 26, respectively, surrounding the port defined by a fluid passage of the connecting nut and the end face of the flange portion 25, as shown in FIG. 3 and the lower left portion of FIG. 4.

Figure 1:
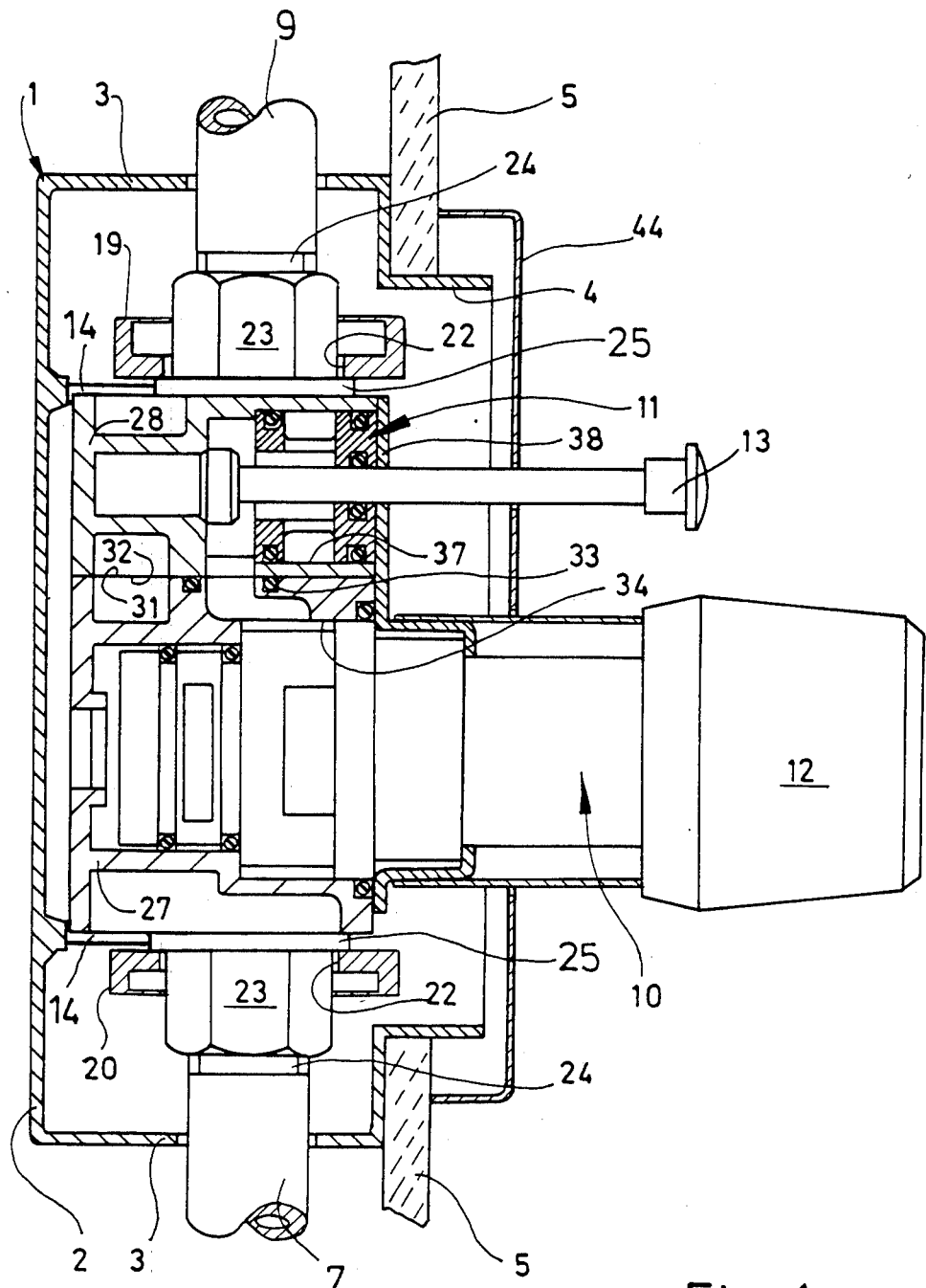
FIG. 1 shows a vertical sectional view of a concealed valve unit including a thermostatic valve and a switching valve adapted to direct a controlled flow of water either to a spout or a shower, the section being taken along line I—I of FIG. 3.
Figure 2:
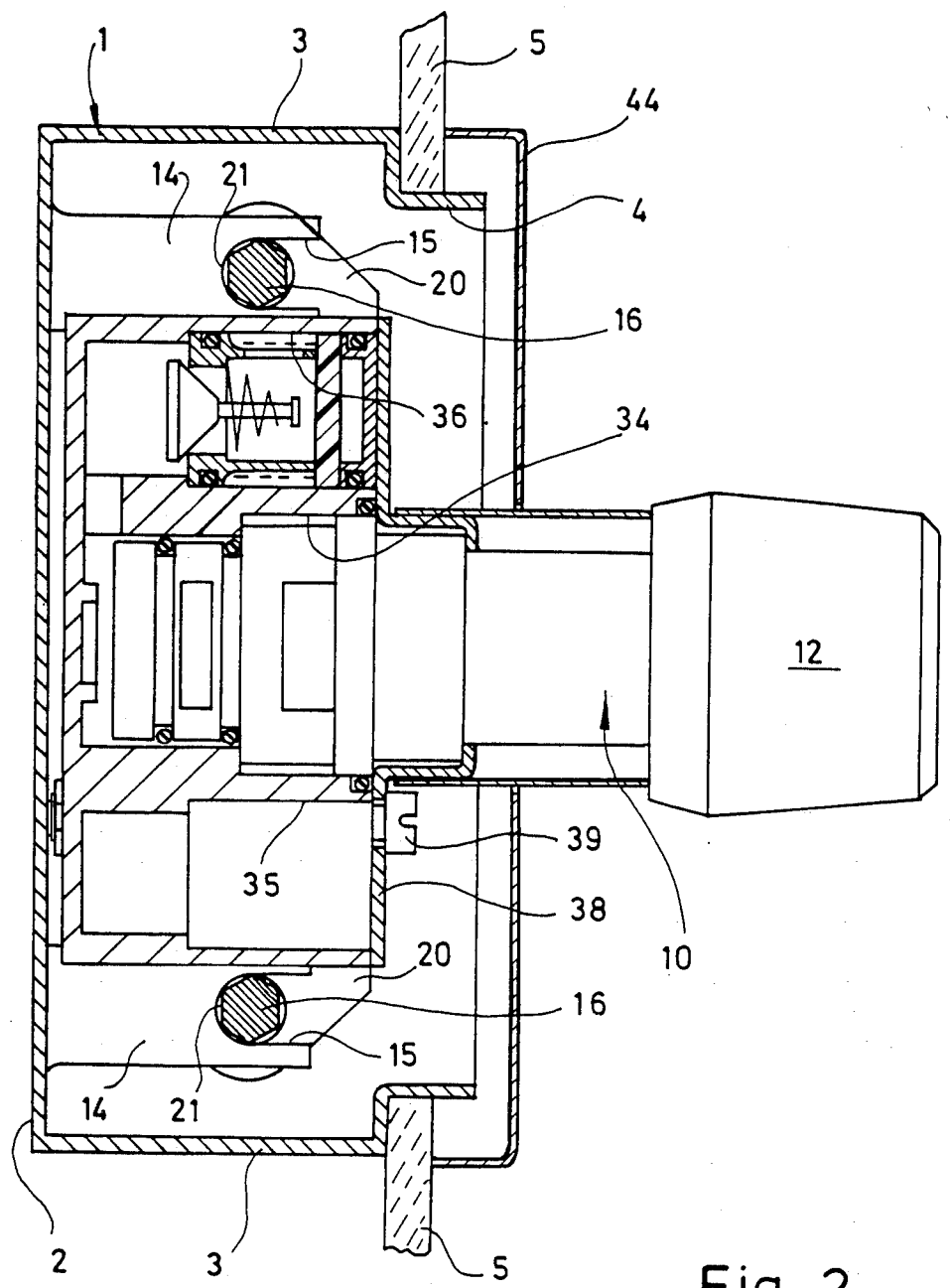
FIG. 2 shows a sectional view of the concealed valve unit and the thermostatic valve thereof, the section corresponding to the angled line II—II of FIG. 3.

In the embodiment shown in FIGS. 1 to 3, a valve body is sealingly clamped between the flange portions 25 of the connecting nuts 23 by dint of the metallic clamping plates 19,20 which preferably are made from steel. The valve body is formed as a split-valve body and includes a valve body segment 27 associated to the thermostatic valve 10 as well as a valve body segment 28 associated to the switching valve 11. The end faces of the connecting nuts 23 engage plane parallel connecting faces 29, 30 of the valve body segment 27 viz. the valve body segment 28 as may be seen from FIG. 3.

The valve body segment 27 and the valve body segment 28 interengage through plane connecting faces 31, 32 (see FIGS. 1 and 3) being parallel to the outer connecting faces 20, 30. One of the two interior connecting faces (in the embodiment shown connecting face 31) receives O-ring seals 33 (see FIG. 1) warranting correct transfer of water between the two valve body segments.

Due to the particular arrangement of valve body segments 27, 28 and to the particular construction of valve body clamping means formed by clamping spindle 16 and clamping plates 19, 20, the valve body including valve body segments 27 and 28 is exposed to no torsional or tensional loads, only very small compressive loads being exerted onto the valve body. Since no threadings must be formed in the valve body segments 27, 28, the latter may be molded from plastic material.

The valve body segments 27, 28 are formed with four stepped valve bores 34–37, valve bore 34 receiving the valve assembly of the thermostatic valve 10, valve bores 35, 36 receiving two check valve assemblies, and valve bore 37 receiving the spout/shower switching valve assembly. A support plate 38 made from sheet metal or preferably cast brass acts as a reaction member taking up the internal pressure of the valve body segments 27, 28. Support plate 38 is fixed to the valve body segment 27 by means of screws 39 extending all the way through valve body segment 27 (see FIGS. 2 and 3) and thus fixing and retaining the valve assemblies received in valve bores 34-37.

In a first installation phase housing 1 is inserted in a corresponding recess of the wall of the building and the connecting nuts 23 are mounted on the ends of feed lines 6, 7 and work lines 8, 9. At this point of the installation procedure normally the circuitry is checked as to the presence of leaks under pressure conditions. In order to allow such testing without valve body segments 27, 28 being inserted between the connecting nuts 23 two simple bridging tube members 41, 42 may be used as shown in FIG. 4. Bridging tube members 41, 42 are inserted between opposing flange portions 25 of respective connecting nuts 23. The bridging tube members 41, 42 are positively positioned by support tabs 40 formed integral with the bottom wall 2 of case 1. In a final phase of the installation procedure, wherein the bridging tube members 41, 42 will be replaced by the valve body segments 27, 28, the support tabs 40 are first broken away from bottom wall 2.

I claim:
1. A concealed valve unit comprising in combination
   (a) a housing adapted to be inserted into a wall opening for flush mounting therein, said housing having openings therein that are sized to accomodate two water supply lines and two output water lines,
   (b) a valve body arranged within said housing, said valve body including control elements and passageways that are adapted to control the flow of water through the valve body,
   (c) operating members operatively associated with said valve body and extending through a mounting window located in said housing,
   (d) said valve body having two spaced apart outer connecting faces, said connecting faces containing openings that communicate with said passageways in said valve body that are adapted to control the flow of water through said valve body,
   (e) connecting nuts that are adapted to be threaded onto the ends of said water supply lines and onto the ends of said output water lines, each of said connecting nuts having a planar end face that is adapted to sealingly engage with the portions of said connecting faces of the valve body that contain openings,
   (f) spaced apart clamping means mounted within said housing for engaging said end connecting nuts so that when said clamping menas are brought together they will clamp the planar end faces of said connecting nuts in sealing engagement with said openings in the connecting faces of the valve body, thereby establishing controlled communication from said water supply lines, through said valve body and out through said output water lines.

2. The valve unit as set forth in claim 1 wherein said clamping means comprises two metallic clamping plates and two threaded clamping spindles interconnecting said metallic clamping plates for relative mutual movement.

3. The valve unit as set forth in claim 2 wherein each of said threaded clamping spindles includes opposing end portions having oppositely formed threadings thereon and engaging with corresponding threadings formed in said metallic clamping plates so that rotation of the clamping spindle in one direction will result in a decrease of the distance defined between said metallic clamping plate, while rotation of said clamping spindle in the opposite direciton will result in an increase of said distance.

4. The valve unit as set forth in claim 3 wherein each of said clamping spindles has a central portion that contains drive faces adapted to cooperate with a spanner.

5. The valve unit as set forth in claim 1 wherein the mounting means for said clamping means include flat parallel mounting tabs arranged in a rectangular pattern, said mounting tabs being supported from a wall of said housing and each includes a cut-out, each of said clamping spindles extending through aligned cut-outs of two opposing mounting tabs.

6. The valve unit as set forth in claim 5 wherein said mounting tabs are formed integral with said case.

7. The valve unit as set forth in claim 5 wherein the cut-out is U-shaped.

8. The valve unit as set forth in claim 1 wherein the valve body is formed by a plurality of valve body segments each having a plane connecting face and the valve body segments are positively clamped together by said clamping means to interengage said plane connecting faces of the valve body segments, and have sealing means interposed therebetween.

9. The valve unit as set forth in claim 2 wherein the metallic plates include thru-openings adapted to receive a connecting nut, and the end portions of the connecting nuts include flange portions each having a diameter which exceeds the diameter of said thru-openings of said metallic plates so that the flange portions of the connecting nuts are forcefully urged against the corresponding connecting face of the valve body when the distance defined between said metallic plates is diminished.

10. The valve unit as set forth in claim 9 wherein o-seal means are carried by the end face of the flange portions of the connecting nuts.

11. The valve unit as set forth in claim 1 wherein the valve body includes at least one valve bore merging into the one surface of the valve body and is accessible through said mounting window, said valve bore being adapted to receive an associated valve control assembly, and a metallic cover overlies said one surface of the valve body and is fixedly connected thereto by screws extending into the valve body.

12. The valve unit as set forth in claim 1 wherein the valve body is made from plastic material.

13. A concealed valve unit comprising in combination
   (a) a housing adapted to be inserted into a wall opening for flush mounting therein, said housing having openings therein that are sized to accomodate at least one water supply line and at least one output water line,
   (b) a valve body arranged within said housing, said valve body including control elements and passageways that are adapted to control the flow of water through the valve body,
   (c) operating members operatively associated with said valve body and extending through a mounting window located in said housing,
   (d) said valve body having two spaced apart outer connecting faces, said connecting faces containing openings that communicate with said passageways in said valve body that are adapted to control the flow of water through said valve body, (e) connecting nuts that are adapted to be threaded onto the ends of each of said water supply lines and onto the ends of each of said output water lines, each of said connecting nuts having a planar end face that is adapted to sealingly engage with the portion of said connecting faces of the valve body that contain openings, (f) spaced apart clammping means mounted within said housing for engaging said planar end faces of said connecting nuts so that when said clamping means are brought together they will clamp the planar end faces of said connecting nuts in sealing engagement with said openings in the connecting faces of the valve body, thereby establishing controlled communication from each water supply line, through said valve body and out through each output water lines.

14. A water flow unit comprising in combination (a) a housing adapted to be inserted into a wall opening for flush mounting therein, said housing having openings therein that are sized to accomodate two water supply lines and two output water lines, (b) two bridging tubes arranged within said housing, said bridging tubes each interconnecting one water supply line with one output water line, said bridging tubes being located between support tabs located on the interior of the housing, (c) connecting nuts that are adapted to be threaded onto the ends of said water supply lines and onto the ends of said output water lines, each of said connecting nuts having a planar end face that is adapted to sealingly engage with an end portion of a bridging tube, (d) spaced apart clamping means mounted within said housing for engaging said planar end faces of said connecting nuts so that when said clamping means are brought together they will clamp the planar end faces of said connecting nuts in sealing engagement with the openings in said bridging tubes, thereby establishing controlled communication from said water supply lines, through said bridging tubes and out through said output water lines.

* * * * *